(12) United States Patent
Penberthy et al.

(10) Patent No.: US 11,749,984 B2
(45) Date of Patent: Sep. 5, 2023

(54) OUTPUT CONTACT FAILURE MONITOR FOR PROTECTION RELAYS IN ELECTRIC POWER SYSTEMS

(71) Applicant: Schweitzer Engineering Laboratories, Inc., Pullman, WA (US)

(72) Inventors: Evan J. Penberthy, Moscow, ID (US); Brian James Peterson, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 204 days.

(21) Appl. No.: 17/316,939

(22) Filed: May 11, 2021

(65) Prior Publication Data

US 2022/0368125 A1  Nov. 17, 2022

(51) Int. Cl.
*H02H 3/00* (2006.01)
*H02H 7/22* (2006.01)
*H02H 1/00* (2006.01)

(52) U.S. Cl.
CPC ............ *H02H 7/22* (2013.01); *H02H 1/0007* (2013.01); *H02H 1/0092* (2013.01)

(58) Field of Classification Search
CPC ...... H02H 7/22; H02H 1/0007; H02H 1/0092; H02H 3/10; G01R 31/3278
USPC ...................................................... 361/42, 88
See application file for complete search history.

(56) References Cited

U.S. PATENT DOCUMENTS

| | | | |
|---|---|---|---|
| 4,420,784 A | 12/1983 | Chen | |
| 4,562,547 A | 12/1985 | Shauger | |
| 4,618,906 A | 10/1986 | Paice | |
| 4,652,962 A | 3/1987 | Howell | |
| 4,658,320 A | 4/1987 | Hongel | |
| 4,704,652 A | 11/1987 | Billings | |
| 5,517,378 A | 5/1996 | Asplund | |
| 5,536,980 A | 7/1996 | Kawate | |
| 5,652,688 A | 7/1997 | Lee | |
| 5,675,640 A | 10/1997 | Tappert | |
| 6,489,748 B1 | 12/2002 | Okamura | |
| 6,816,350 B1 | 11/2004 | Hoopes | |
| 6,956,725 B2 | 10/2005 | Boughton | |
| 7,728,749 B2 | 6/2010 | Sahu | |
| 7,778,262 B2 | 8/2010 | Beagley | |

(Continued)

OTHER PUBLICATIONS

Tony Lee, Joe Mooney. "Two Hybrid Contact Output Circuits", Sep. 25, 1998.

(Continued)

*Primary Examiner* — Jared Fureman
*Assistant Examiner* — Lucy M Thomas
(74) *Attorney, Agent, or Firm* — PCFB, LLC; Gregory C. Baker; Terry S. Jones (57) ABSTRACT

Output circuit devices for use in electric power systems may include a first output subsystem for transmitting a first signal output via an output port to a component of the electric power system, an input subsystem for receiving and monitoring the first signal output transmitted by the first output subsystem, and a second output subsystem for transmitting another signal output to the component of the electric power system. The second output subsystem is to transmit the signal output in response to an indication from the input subsystem. Intelligent electronic devices (IEDs) and associated methods may include one or more output circuit devices.

21 Claims, 5 Drawing Sheets

(56) References Cited

U.S. PATENT DOCUMENTS

| | | |
|---|---|---|
| 8,477,517 B2 | 7/2013 | Joshi |
| 8,569,915 B1 | 10/2013 | Schweitzer |
| 2007/0120694 A1 | 5/2007 | Lindsey |
| 2007/0127177 A1 | 6/2007 | Benton |
| 2008/0204274 A1 | 8/2008 | Peters |
| 2009/0125124 A1 | 5/2009 | Premerlani |
| 2018/0145496 A1* | 5/2018 | Zeller .................. G01R 31/086 |
| 2019/0319452 A1* | 10/2019 | Peterson .............. H04B 10/802 |
| 2020/0021100 A1* | 1/2020 | Kwon ..................... H02H 3/10 |

OTHER PUBLICATIONS

Tony Lee, Edmund O. Schweitzer, "Measuring and Improving the Switching Capacity of Metallic Contacts", 26th Annual Western Protective Relay Conference, Oct. 26-28, 1999.

* cited by examiner

OUTPUT CONTACT FAILURE MONITOR FOR PROTECTION RELAYS IN ELECTRIC POWER SYSTEMS

TECHNICAL FIELD

The present disclosure relates to input and output circuits for use with electric power systems, for example, in protection relays of the electric power systems. More specifically, but not exclusively, embodiments of this disclosure pertain to input circuits that may be used in conjunction with an output circuit (e.g., a relay trip) in order to monitor an output signal generated by the output circuit. Such input and output circuits may be used in protection relays for use in electric power transmission and distribution systems.

BRIEF DESCRIPTION OF THE DRAWINGS

This disclosure includes various non-limiting and non-exhaustive embodiments. For some embodiments, reference is made to certain illustrative embodiments that are depicted in the figures described below.

DETAILED DESCRIPTION

Modern electric power systems incorporate a variety of technologies to monitor, protect and/or control distribution and transmission of electric power. Protective relays, monitoring equipment, motor protection relays, real-time automation controllers, and various other intelligent electronic devices (IEDs) may communicate with each other and/or receive information from various components within the electric power system. For example, protective relays may evaluate electrical conditions and implement control actions based on the evaluation.

According to various embodiments, an IED for protecting, monitoring, and/or controlling components within electric distribution and transmission systems may utilize devices (e.g., circuits) to monitor electric power systems and to output signals related to other components of the system. For example, the IED may utilize circuits (e.g., binary circuits, also referred to herein as digital or contact circuits) to receive information (e.g., signals, binary signals) provided via inputs and/or to output (e.g., transmit) signals to other components of the system. In additional embodiments, other types of IEDs may utilize such devices or circuits as well. In some embodiments, one or more output circuits may be formed as a device or devices that are received or housed in an IED (e.g., a protective relay) with one or more similar devices.

Typically, an output circuit may be used to provide an output signal (e.g., a trip) to another device of the electric power system (e.g., a breaker) resulting in a desired event. For example, the output circuit may provide an output signal to the breaker to trip (e.g., open) the breaker to interrupt power flow. In some instances, the output circuit device may be activated based on a fault detected by a separate input circuit device of the IED (e.g., a protective relay) for detecting one or more faults in an electric power system. While external monitoring equipment at or near the breaker may be utilized to confirm if the breaker has tripped (e.g., and transmit that information back to the IED via the input circuit), such monitoring may take a relatively longer amount of time to confirm whether the breaker has interrupted power flow or if further intervention is necessary as these events take place at a location external to the IED or output device.

Embodiments of the present disclosure may include circuit devices with one or more integrated monitors (e.g., within the circuit or device, not external to the output device or IED in which the device is housed) that monitors (e.g., directly monitors) the output signal of the output circuit device rather than having to monitor only the expected result of the output signal at an external location. That is, the output circuit device may include an input circuit that monitors (e.g., directly monitors without other devices or componentry therebetween) the output signal of the output circuit of the device locally. Such a configuration may enable a failure in the output signal of the output circuit to be detected in relatively less time (e.g., substantially simultaneously, in less than one second, less than one hundred milliseconds, less than ten milliseconds, etc.) as such a failure can be detected as the output signal is provided rather than relying on the monitoring of external and/or downstream components.

In some embodiments, the output circuit device may include an embedded binary input in the output contact (e.g., circuit) used for tripping a breaker or another device to provide confirmation that the output contact has operated. As detected by the input circuit, when the output contact fails to operate, a trip signal may be quickly issued to a secondary or another output contact wired to trip the breaker. For example, if the first output contact fails to detect a signal (e.g., voltage and/or current) from the first output contact capable of tripping the breaker, the IED may command another output contact to produce a similar or the same signal. In some embodiments, the same input circuit or another input circuit may be used to verify the outputted trip signal from the secondary output circuit.

Such configurations may prevent a costly breaker or other device failure operation due to trip output contact failure and the lengthy breaker failure and retrip delays that may lead to further damage to the power system. Embodiments of the disclosure may further provide the ability to detect and alarm for trip output contact failures before the failure results in a breaker failure operation. For example, a fault in the outputted signal may be detected at the device as the faulty signal is outputted to the breaker or the input circuit may determine if an outputted signal is not even generated to be outputted to the breaker.

In some embodiments, the output device may include configurable circuits (e.g., configurable binary circuits) that combine an input and an output to create, for example, a single configurable binary input and/or output port. As discussed below, the binary circuit may be configured as a binary input, a binary output, or both a binary input and output. In some embodiments, where the configurable binary circuit is used as both a binary input and output, the outputted signal across the output terminals generated by the circuit acting as a binary output circuit may also be monitored with the binary input componentry.

In some embodiments, the input or output circuits may be capable of accepting and/or transmitting a wide range of voltage and is configurable for any voltage within a selected range (e.g., 0 to 300 volts, 24, 48, 110, 125, 220, 250 volts, etc.).

The circuits of the fault device may be configured as one or more of a normally open circuit (e.g., a normally open switch), a normally closed circuit (e.g., a normally closed switch), a combination of an open and closed circuit (e.g., a circuit including one or more common leads with a normally open portion and a normally closed portion). In some embodiments, one or more of the circuits may be configured as a standard binary output (e.g., including an electromechanical relay only), a hybrid binary output (e.g., including both an electro-mechanical relay and a solid-state device), or a solid-state binary output.

In an example embodiment, an IED, such as a protective relay, includes a plurality of circuits to receive various inputs from various other IEDs within a system or to output signals to those same devices. Each circuit provides reinforced isolation of the DC or AC signals (e.g., voltages, currents, etc.) as the signals are transmitted to and from an IED controller via a protection subcircuit. The IED may include a variety of other inputs for monitoring various components of the electric power system and/or various control and/or protection outputs, including signal outputs.

In some embodiments, an IED (e.g., a protective relay) may include one or more binary circuits that each accommodate binary input between 0 and 300 Volts (AC or DC) and reduce power consumption at high voltages. In some embodiments, adaptations may be made to accommodate even higher voltages.

The embodiments of the disclosure can be further understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps to be executed only once, unless otherwise specified.

In some cases, well-known features, structures, or operations are not shown or described in detail. For example, numerous rectification circuits and approaches for rectification are available and so are not described in detail herein. Furthermore, the described features, structures, or operations may be combined in any suitable manner in one or more embodiments. It is also appreciated that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic devices) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

Figure 1:
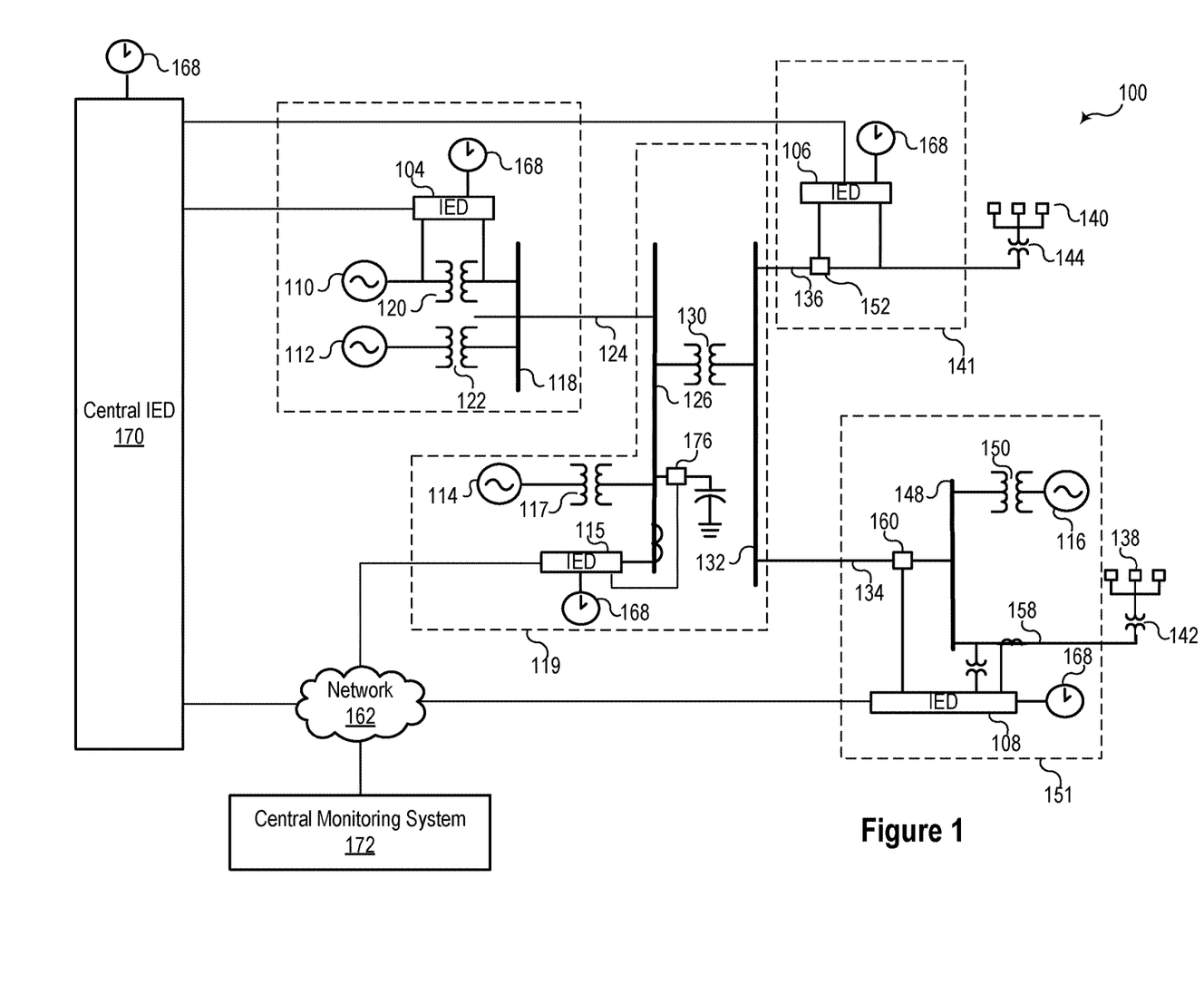
FIG. 1 illustrates an example of a simplified diagram of an electric power transmission and distribution system consistent with embodiments of the present disclosure.

FIG. 1 illustrates an example of an embodiment of a simplified one-line diagram of an electric power transmission and distribution system 100 in which a plurality of communication devices may facilitate communication in a network (e.g., a software-defined network). The electric power delivery system 100 may be configured to generate, transmit, and distribute electric energy to loads. Electric power delivery systems may include equipment, such as electric generators (e.g., generators 110, 112, 114, 116), power transformers (e.g., transformers 117, 120, 122, 130, 142, 144, 150), power transmission and delivery lines (e.g., lines 124, 134, and 158), circuit breakers (e.g., breakers 152, 160, 176), busses (e.g., busses 118, 126, 132, and 148), loads (e.g., loads 140, and 138) and the like. A variety of other types of equipment may also be included in the electric power delivery system 100, such as voltage regulators, capacitor banks, and a variety of other types of equipment.

A substation 119 may include a generator 114, which may be a distributed generator, and which may be connected to a bus 126 through the step-up transformer 117. The bus 126 may be connected to a distribution bus 132 via a step-down transformer 130. Various distribution lines 136 and 134 may be connected to the distribution bus 132. The Distribution line 136 may lead to a substation 141 where the line is monitored and/or controlled using an intelligent electronic device (IED) 106, which may selectively open and close the breaker 152. A load 140 may be fed from the distribution line 136. Further step-down transformer 144 in communication with the distribution bus 132 via the distribution line 136 may be used to step down a voltage for consumption by the load 140.

The distribution line 134 may lead to a substation 151, and deliver electric power to the bus 148. The bus 148 may also receive electric power from the distributed generator 116 via the transformer 150. The distribution line 158 may deliver electric power from the bus 148 to the load 138, and may include further step-down transformer 142. A circuit breaker 160 may be used to selectively connect the bus 148 to the distribution line 134. An IED 108 may be used to monitor and/or control circuit breaker 160 as well as distribution line 158.

The electric power delivery system 100 may be monitored, controlled, automated, and/or protected using IEDs, such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within an electric power system. Such devices may include, for example, remote terminal units, differential relays, distance relays, directional relays, feeder relays, overcurrent relays, transformer relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout the system 100. Utilizing a common or universal time source may ensure that IEDs have a synchronized time signal that can be used to generate time-synchronized data, such as synchrophasors. In various embodiments, the IEDs 104, 106, 108, 115, and 170 may receive a common time signal 168. The time signal may be distributed in the system 100 using a communications network 162 or using a common time source, such as a Global Navigation Satellite System ("GNSS"), or the like.

According to various embodiments, a central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from the IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via a network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multi-function hardware (e.g., processors, computer-readable storage media, communications interfaces, etc.) that can be utilized in order to perform a variety of tasks that pertain to network communications and/or to operation of equipment within system 100.

Any of the various IEDs 104, 106, 108, and 115, breakers 152, 160, 176, generators 110, 112, 114, and 116, transformers 117, 120, 122, 130, 142, 144 and 150, and/or other devices and components of the system 100 may utilize DC binary inputs to make control, monitoring, and protection decisions. Accordingly, the presently described systems and methods for providing reinforced isolation of universal binary input voltages (e.g., 0 Vdc to 300 Vdc) with reduced power dissipation for high voltages may be implemented in conjunction with a wide variety of devices within an electric power delivery system. Thus, the examples of implementation within a protective relay are merely illustrative of one of the numerous possible implementations.

Figure 2:
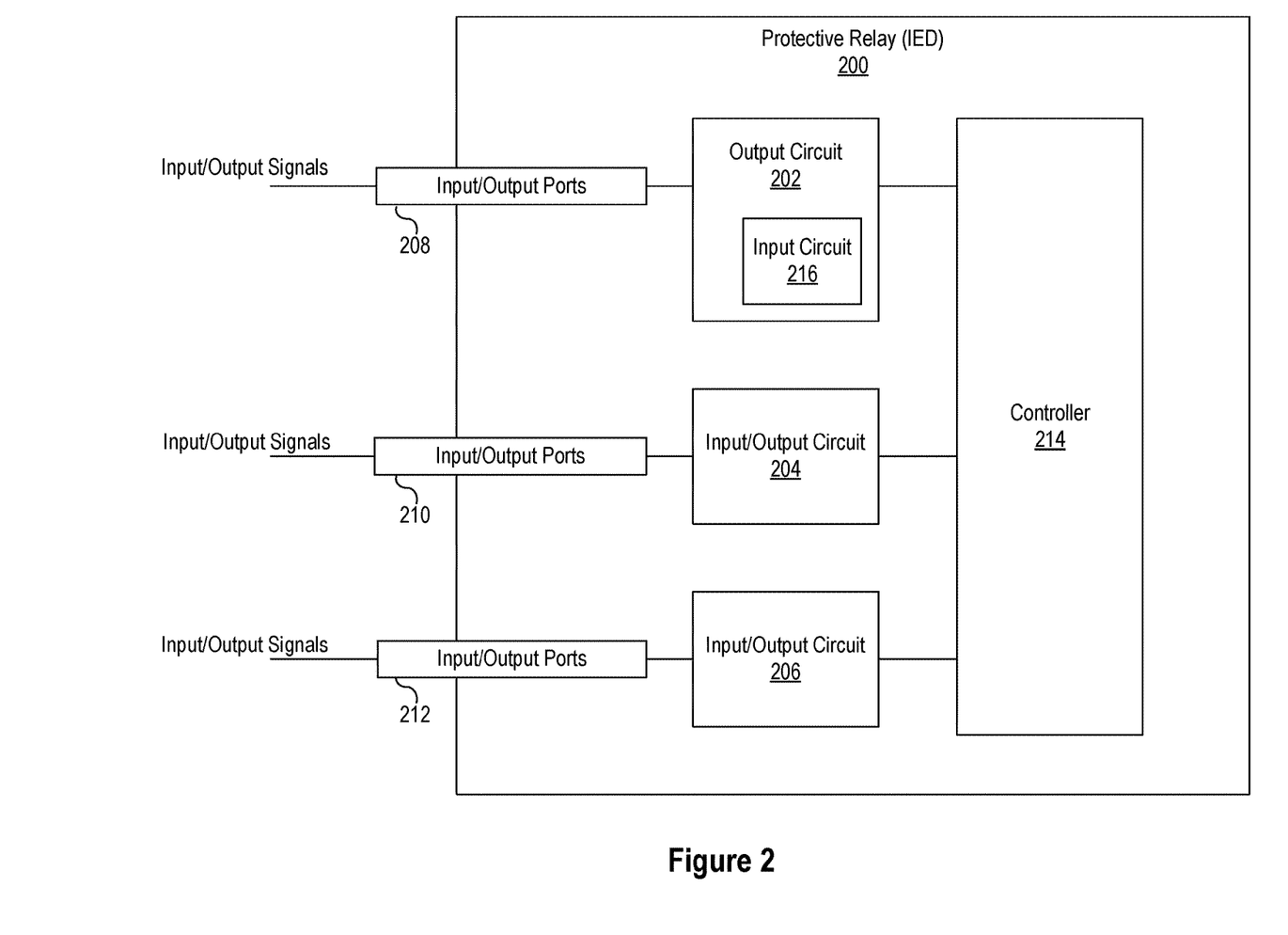
FIG. 2 illustrates an example of a simplified diagram of an intelligent electronic device (IED) with output circuit devices consistent with embodiments of the present disclosure.

FIG. 2 illustrates an example of an IED (e.g., simplified protective relay 200) with input/output circuits 202, 204, and 206 (e.g., binary circuits electrically coupled to one or more input/output ports 208, 210, and 212 (e.g., one circuit connected to a respective combined port). Each of the input/output circuits 202, 204, and 206 may be configured for transmitting and/or receiving signals (e.g., voltage and/or current).

One or more of the circuits 202, 204, and 206 may comprise an output circuit device (e.g., output circuit 202) that includes an integrated input circuit 216 that monitors the output signals of the output circuit 202 at the associated output port 208. While only circuit 202 is designated as an output circuit with an associated input circuit 216, all or some of the remaining circuit 204, 206 of the IED 200 may also comprise such an output circuit.

In some embodiments, one or more of the circuits 202, 204, and 206 or portions thereof may be configured (e.g., via a software and/or firmware switch) to operate as a binary input circuit, a binary output circuit, or a combination of a binary input circuit and a binary output circuit. While three circuits are shown in FIG. 2, any number of circuits (e.g., dedicated and/or configurable) may be used.

In some embodiments, the IED 200 may include a terminal block for the binary inputs and outputs that includes 2*N terminals, where N is the number of binary inputs/outputs. In such embodiments, each binary input/output is independently connected to the IED 200 at two terminals (e.g., two polarity insensitive terminals). In additional embodiments, the IED 200 may include a terminal block for the binary inputs/outputs that includes N+1 terminals, where N is again the number of binary inputs/outputs. In such embodiments, one wire of each binary input may be wired to a single common terminal (e.g., a common negative or ground).

The output circuit 202 may send signals (e.g., voltage and/or current) via the respective port 208, which is configured as an output port. In some embodiments, the signals from the output circuit 202 may be sent via the port 208 to respond to selected events (e.g., by sending commands based on the detection of a certain event) and/or to otherwise communicate with other components (e.g., other IEDs, such as those listed above) of the system.

In some embodiments, the input circuit 216 of the output circuit 202 may communicate the state of an input signal to a controller 214 to aid the protective relay 200 in making a protective decision. The protective relay 200 may respond and/or communicate via the output circuit 202 at the output port 208.

In some embodiments, the controller 214 may include other outputs, such as multi-channel digital communication outputs and/or analog outputs. Such a response may include, but is not restrained to, tripping a circuit breaker; opening or closing a recloser; or providing an alarm signal to another protective relay. Protective relays may have any number of input circuits.

In some embodiments, protective relay 200 may include additional inputs, such as monitoring inputs, and/or various other complex components that are not described herein to avoid obscuring the presently described systems and methods. In the illustrated embodiment, the monitoring circuits 202, 204, and 206 may provide reinforced isolation of the input/output ports 208, 210, and 212 via input circuits (not shown) and isolation for providing electrically isolated communication with the controller 214.

Figure 3:
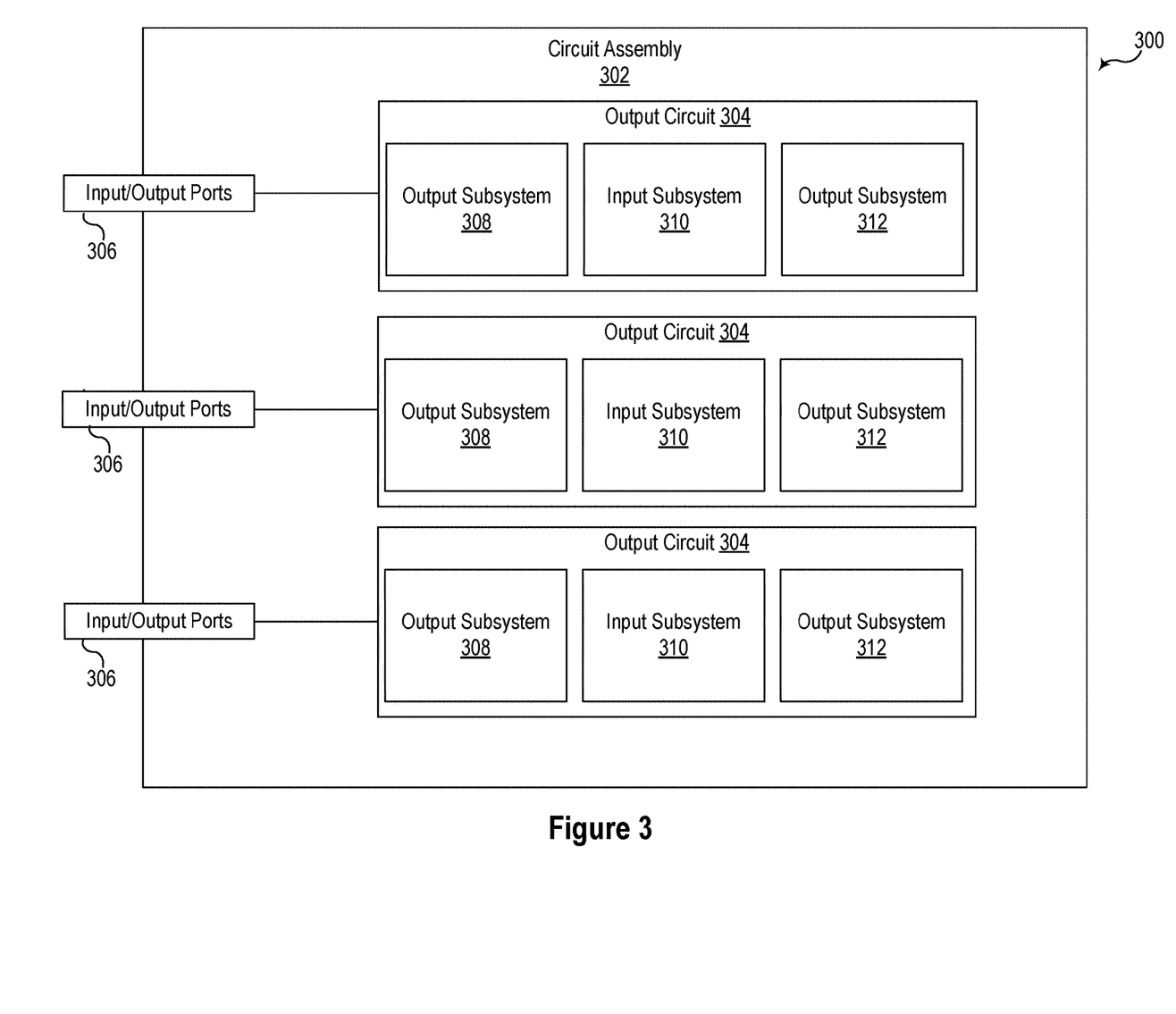
FIG. 3 illustrates a simplified representation of a protective intelligent electronic device (IED) including output circuit devices consistent with embodiments of the present disclosure.

FIG. 3 illustrates a simplified representation of a protective intelligent electronic device (IED) 300 (e.g., a protective relay) including a circuit assembly 302 having one or more circuits (e.g., binary circuits 304). As depicted, the binary circuits 304 may be electrically coupled to input/output ports 306.

Each of the binary circuits 304 may include a first output subsystem 308 for transmitting an output signal, an input subsystem 310 for receiving and/or monitoring an input signal, and a second output subsystem 312 (e.g., a secondary or additional) for transmitting another output signal. The first output subsystem 308, the input subsystem 310, and the binary output subsystem 312 may be connected to one or more common or individual ports of the input/output ports 306 (e.g., including multiple dedicated and/or configurable ports) for routing the input and/or output signals.

As discussed above, the first output subsystem 308 may transmit a first signal output via the output port 306 to another component of the electric power system that is in communication with the output circuit 304 at the output port 306. The input subsystem 310 may receive and monitor the first signal output transmitted by the first output subsystem 308 at the output port 306. The input subsystem 310 may verify that the first signal output transmitted by the first output subsystem 308 is within a selected signal range. For example, when a selected event occurs and is signaled to the circuit assembly 302, the first output subsystem 308, which may act as a switch, outputs an expected signal within a selected signal range.

If no signal and/or a signal outside of an expected range (e.g., an unexpected signal), the input subsystem 310 may indicate the likely failure of the first output signal (e.g., by measuring a differential voltage across the output port 306). In response to the fault detected by the input subsystem 310, the circuit assembly 302 may use the second output subsystem 312 to transmit another (e.g., a second) signal output via the output port 306 to the component of the electric power system. Additional signals from the same or additional output circuit may continue to be sent until a desired outcome is achieved (e.g., a breaker trip).

Each of the circuits or devices discussed below with reference to FIG. 4 through FIG. 7 may operate in a similar manner as those circuits and devices discussed above, in some embodiments.

Figure 4:
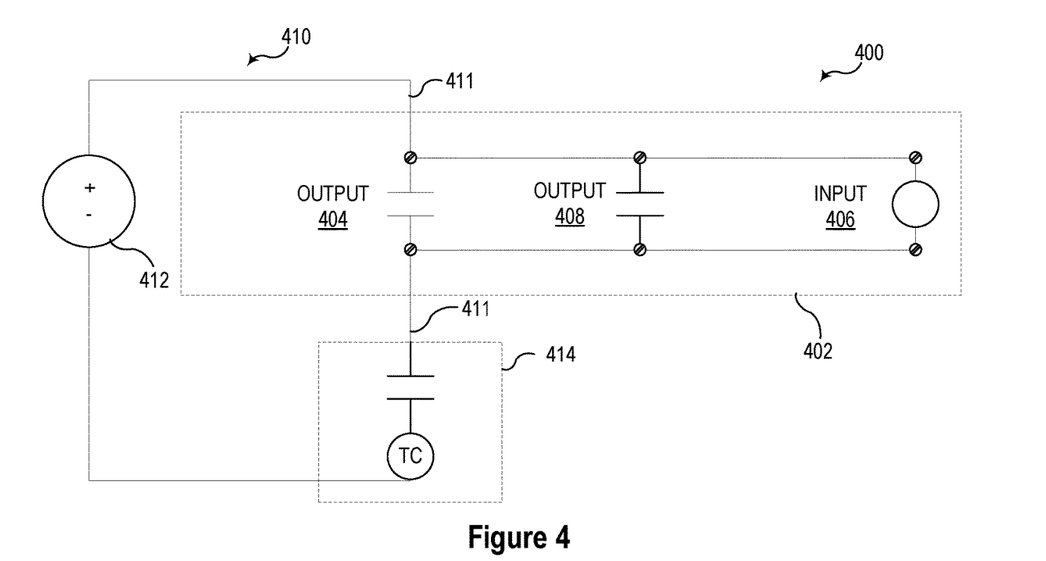
FIGS. 4 through 7 each illustrate a simplified representation of one or more output circuit devices consistent with various embodiments of the present disclosure.

FIG. 4 illustrates a simplified representation of an output circuit 402 in a circuit assembly or IED 400. As depicted, circuit 402 may include a first output 404, an input 406, and a second output 408. The output circuit 402 may include one or more corresponding input/output ports 411.

The IED 400 may be coupled to a portion of an electric power system 410 including a power source 412 (e.g., generators, batteries, etc.) and one or more other components of the electric power system 410 (e.g., breaker 414 including a trip coil).

As discussed in detail above, the outputs 404, 408 may provide a redundant system of tripping the breaker 414 with the input 406 monitoring the output signal of the outputs 404, 408 for verification of the output signal.

As indicated in FIG. 4, one or more of the outputs 404, 408 may be normally open circuits. For example, the outputs 404, 408 may operate as an open switch where signals are not flowing through the outputs 404, 408 (e.g., not energized). In operation, the IED 400 or portion thereof (e.g., a controller) may close the outputs 404, 408 when signals are to be passed through (e.g., transmitted from and/or received by) the outputs 404, 408, respectively. For example, the IED 400 may alter the outputs 404, 408 from a default open state to a closed state, thereby energizing outputs 404, 408.

Figure 5:
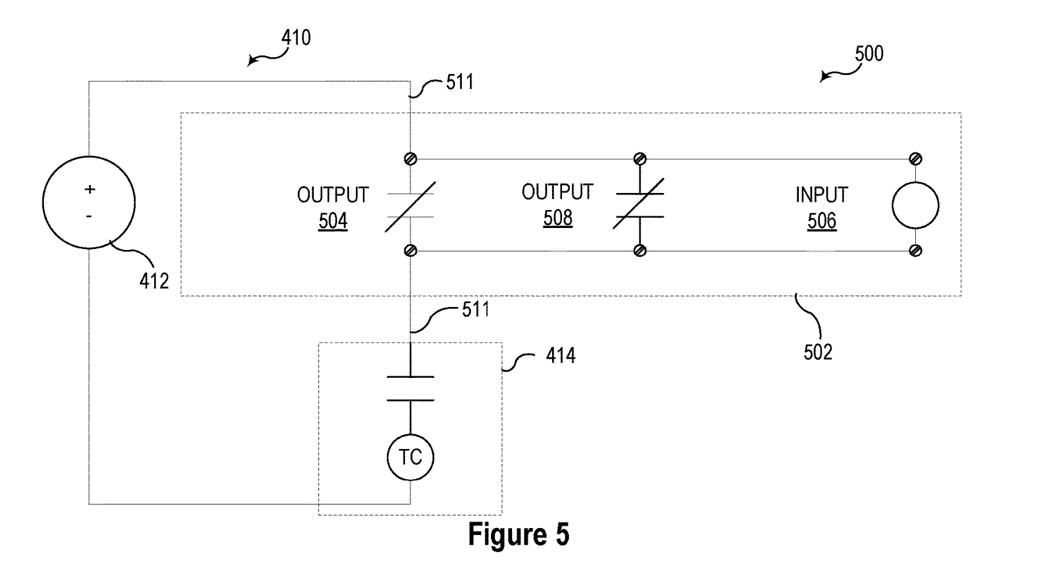

FIG. 5 illustrates a simplified representation of an output circuit 502 in a circuit assembly or IED 500. As depicted, circuit 502 may include a first output 504, an input 506, and a second output 508. The output circuit 502 may include one or more corresponding input/output ports 511.

As indicated in FIG. 5, one or more of the outputs 504, 508 may be normally closed circuits. For example, one or more of the outputs 504, 508 may operate as a closed switch where signals may flow through the outputs 504, 508 (e.g., energizing the circuit). In operation, the IED 500 or portion thereof (e.g., a controller) may open the outputs 504, 508 when signals are no longer to be passed through (e.g., transmitted from and/or received by) the outputs 504, 508, respectively. For example, the IED 500 may alter the outputs 504, 508 from a default closed state to an open state, thereby not energizing the outputs 504, 508.

In additional embodiments, the outputs 504, 508 may comprise combinations of open and closed circuits.

Figure 6:
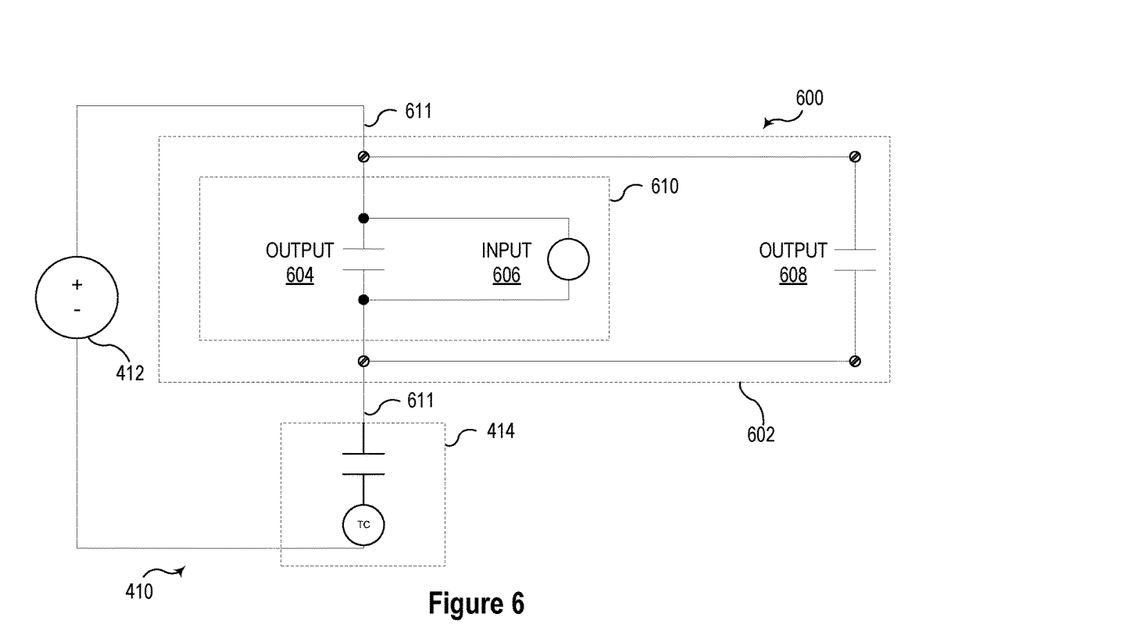

FIG. 6 illustrates a simplified representation of an output circuit 602 in a circuit assembly or IED 600. As depicted, circuit 602 may include a first output 604, an input 606, and a second output 608. The output circuit 602 may include one or more corresponding input/output ports 611. As depicted, one or more of the outputs (e.g., output 604) may comprise a configurable circuit 610. The configurable circuit 610 may be configured as an input, output, or both an input and an output. In this embodiment, the configurable circuit 610 may define both the first output 604 and the input 606.

As above, in some embodiments, one or more of the outputs 604, 608 may be normally open circuits similar to that shown in FIG. 4. In additional embodiments, one or more of the outputs 604, 608 may be normally closed circuits similar to that shown in FIG. 5.

Figure 7:
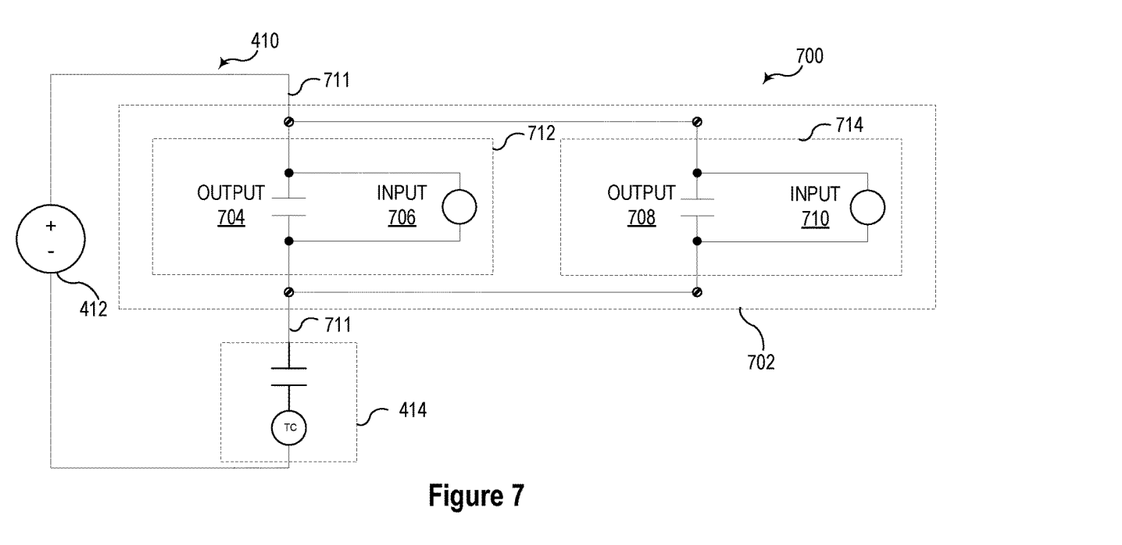

FIG. 7 illustrates a simplified representation of an output circuit 702 in a circuit assembly or IED 700. As depicted, circuit 702 may include a first output 704, a first input 706, a second output 708, and a second input 710. The output circuit 702 may include one or more corresponding input/output ports 711. As depicted, one or more of the outputs (e.g., output 704 and output 708) may comprise respective configurable circuits 712, 714. As above, the configurable circuits 712, 714 may be configured as an input, output, or both an input and an output. In this embodiment, the configurable circuit 712 may define both the first output 704 and the first input 706. In some embodiments, the configurable circuit 714 may define both the second output 708 and the second input 710 where the second input 710 monitors the second output 708 and the first input 706 monitors the first output 704. In additional embodiments, the configurable circuit 714 may define only the second output 708 where the first input 706 monitors both the first output 704 and the second output 708.

As above, in some embodiments, one or more of the outputs 704, 708 may be normally open circuits similar to that shown in FIG. 4. In additional embodiments, one or more of the outputs 704, 708 may be normally closed circuits similar to that shown in FIG. 5.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined to encompass the following claims.

What is claimed is:

1. An output circuit device for use in an electric power system, comprising:
    an output port to transmit signals to and to be in communication with a component of the electric power system;
    a first output subsystem for transmitting a first signal output via the output port to the component of the electric power system that is in communication with the output circuit device at the output port;
    an input subsystem for receiving and monitoring the first signal output transmitted by the first output subsystem at the output port, the input subsystem to verify that the first signal output transmitted by the first output subsystem is within a selected signal range; and
    a second output subsystem for transmitting another signal output via the output port to the component of the electric power system, the second output subsystem to transmit the signal output in response to an indication from the input subsystem that the first signal output transmitted by the first output subsystem is outside of the selected signal range; and
  wherein each of the first output subsystem, the input subsystem, and the second output subsystem are housed within an output device and the component of the electrical power system is separate from the output device.

2. The output circuit device of claim 1, wherein at least one of the first output subsystem and the second output subsystem comprises a binary circuit.

3. The output circuit device of claim 2, wherein at least one of the first output subsystem or the second output subsystem comprises a configurable binary circuit that is programmable to operate as a binary output circuit, a binary input circuit, or both a binary output circuit and a binary input circuit when selected.

4. The output circuit device of claim 1, wherein the first output subsystem is to supply a first trip signal to the component of the electric power system comprising a breaker.

5. The output circuit device of claim 4, wherein the input subsystem is to monitor a differential voltage across the output port to determine whether the first trip signal generated from the first output subsystem comprises a signal capable of tripping the breaker.

6. The output circuit device of claim 5, wherein the second output subsystem is to generate and send a second trip signal to the breaker if the first trip signal generated for the first output subsystem is determined by the input subsystem to not be capable of tripping the breaker.

7. The output circuit device of claim 6, wherein the input subsystem is to monitor a differential voltage across the output port to determine whether the second trip signal generated from the second output subsystem comprises a signal capable of tripping the breaker.

8. The output circuit device of claim 1, wherein the first output subsystem and the second output subsystem each comprise at least one of an electromechanical relay or a solid-state binary output.

9. The output circuit device of claim 8, wherein the input subsystem is to monitor an output of the at least one of the electromechanical relay or the solid-state binary output of the first output subsystem and the second output subsystem.

10. The output circuit device of claim 1, wherein the output circuit device comprises at least one of a normally open circuit or a normally closed circuit.

11. An intelligent electronic device (IED) of an electric power system, comprising the output circuit device of claim 1 and one or more controllers in communication with and for operating the output circuit device, and wherein the IED is the output device housing the first output subsystem, the input subsystem, and the second output subsystem.

12. The IED of claim 11, wherein both the first output subsystem and the second output subsystem comprise a binary circuit.

13. The IED of claim 12, wherein at least one of the first output subsystem and the second output subsystem comprises a configurable binary circuit that is programmable to operate as one or more of a binary output circuit or as a binary input circuit when selected.

14. The IED of claim 13, wherein the configurable binary circuit of the at least one of the first output subsystem and the second output subsystem is programmable to operate as the input subsystem and one of the first output subsystem or the second output subsystem.

15. The IED of claim 13, wherein both of the first output subsystem and the second output subsystem each comprise the configurable binary circuit.

16. The IED of claim 11, wherein the first output subsystem is to supply a first trip signal to the component of the electric power system comprising a breaker and the second output subsystem is to supply a second trip signal to the breaker.

17. The IED of claim 16, wherein the output circuit device is to send the second trip signal to the breaker only when the input subsystem determined that the second trip signal has not been transmitted by the first output subsystem.

18. The IED of claim 11, wherein the IED is to provide an alarm signal in response to the indication from the input subsystem failing to detect the first signal output transmitted by the first output subsystem at the output port.

19. A method of triggering a breaker of an electric power system using the intelligent electronic device (IED) of claim 11, the method comprising:
    transmitting one or more signals to the breaker of the electric power system with the output port;
    transmitting a first signal output via the output port to the breaker of the electric power system with the output circuit device;
    monitoring the first signal output transmitted by the output circuit device with the input subsystem;
    determining if the first signal output transmitted by the output circuit device has been transmitted through the output port with the input subsystem; and if the first signal output transmitted by the output circuit device is not determined as being transmitted through the output port with the input subsystem, transmitting a second signal output via the output port to the breaker of the electric power system with the second output circuit.

20. The method of claim 19, further comprising monitoring a voltage of the first signal output at the output circuit with the input subsystem.

21. The method of claim 19, further comprising configuring a circuit of at least one of the input subsystem, the output circuit, or the second output circuit to comprise a binary input circuit, a binary output circuit, or both a binary input circuit and a binary output circuit.

\* \* \* \* \*